G. SINCLAIR.
MEANS FOR THE CONTROL OF THE FLOW OF AIR IN WATER TANKS.
APPLICATION FILED JULY 23, 1914.

1,159,721.

Patented Nov. 9, 1915.

Witnesses:

Inventor:
George Sinclair,
by: Bradbury
Attorney.

UNITED STATES PATENT OFFICE.

GEORGE SINCLAIR, OF ST. PAUL, MINNESOTA, ASSIGNOR, BY DIRECT AND MESNE ASSIGNMENTS, TO CLIFFORD L. NILES, OF ANAMOSA, IOWA.

MEANS FOR THE CONTROL OF THE FLOW OF AIR IN WATER-TANKS.

1,159,721.

Specification of Letters Patent.

Patented Nov. 9, 1915.

Application filed July 23, 1914. Serial No. 852,741.

*To all whom it may concern:*

Be it known that I, GEORGE SINCLAIR, a citizen of the United States, residing at St. Paul, in the county of Ramsey and State of Minnesota, have invented a new and useful Improvement in Means for the Control of the Flow of Air in Water-Tanks, of which the following is a specification.

My invention relates to improvements in means for the control of the flow of air in water-tanks. When it is desired to pass air through a volume of water to purify and cool the air, I have found in practice that if the air is compressed before entering the water and allowed to cool to normal temperature before its pressure is materially lowered and after being released in the water, it will either raise the temperature of the water only moderately or maintain it at normal temperature, whereby a small volume of water can be used to cool and purify a very large amount of air.

While it is not unusual to pass air through water, I am not aware of any devices for cooling air and regulating its flow. To have a successfully operating device I have also found that it must be readily adjustable for different temperatures, that is different temperatures of air introduced into the device so as to give off a uniform temperature from the device.

There are numerous uses to which my device can be used where a purified low temperature air is desired one of which being particularly advantageous in the butter making art.

Figure 1:
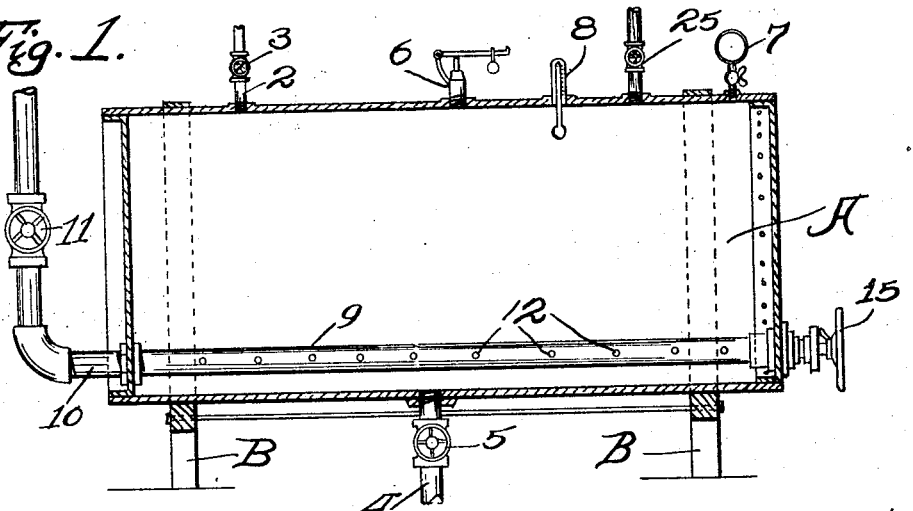
Figure 2:
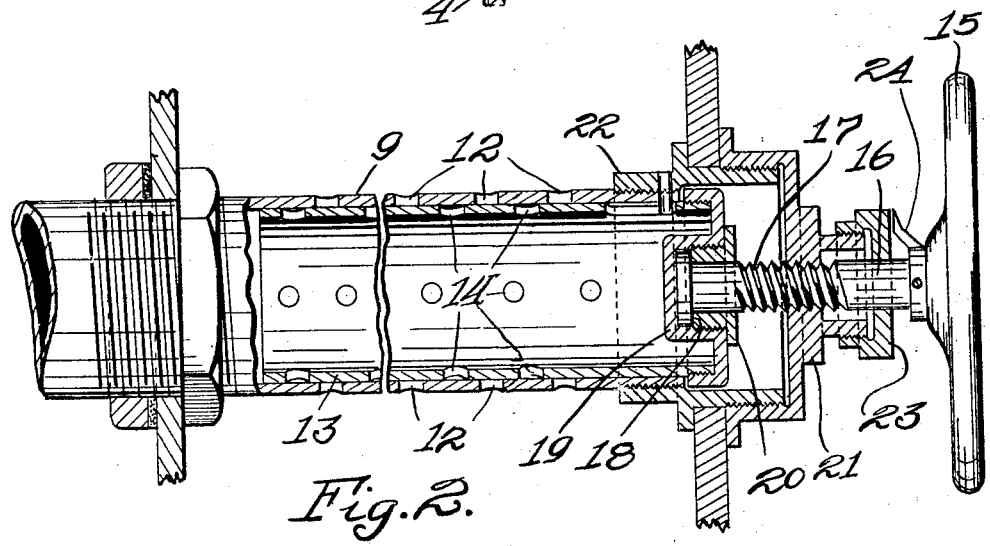
Figure 3:
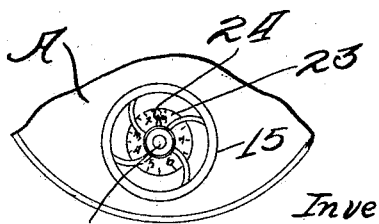

In the drawings which form part of this specification; Figure 1 is a sectional elevation of my device; Fig. 2 is a detail in section of my invention and Fig. 3 is another detail.

In the drawings A illustrates a water tank of ordinary construction mounted on a suitable frame B. The tank A in use is adapted to be filled about two fifths full of water by a pipe 2 which is closed by a valve 3, and a drain pipe 4 in the bottom of the tank having a shut-off valve 5, which can be used to drain the tank A when desired.

An ordinary safety valve 6 is fitted to the tank A and a pressure gage 7 indicates the pressure in the tank. To assist the operator, a thermometer 8 is also fitted to the tank A. Air is introduced into the tank A through a perforated pipe 9 having holes 12 and extending along the bottom of the tank and which is connected to a blower or air pump (not shown) by the pipe 10. A suitable valve 11 in the pipe 10 prevents any back pressure on the pump or blower. The openings 12 in the pipe 9 are opened and closed by a close fitting sleeve 13 extending along the inside of the pipe 9 which has openings 14 of the same size as the openings 12 and which correspond with said openings when the sleeve 13 is drawn back and forth. The sleeve 13 is operated by a handle 15 which is rigidly secured to one end of a stem 16 having a threaded portion 17, and a shoulder 18 formed on its free end being free to turn in the coupling 19 which is secured to the end of the sleeve 13. A nut 20 which engages the shoulder 18 holds the stem in the coupling 19.

The threaded portion 17 of the stem 16 carries the nut 21 which is rigid with the tank A and is secured to the collar 22 which holds one end of the pipe 9, the other end of the pipe 9 being secured in the tank A. Thus when the handle 15 is turned in one direction it will draw the sleeve forward and open the holes 12 while if turned in the opposite direction it will force the sleeve back and close the holes 12. As illustrated in Fig. 3, the holes 12 are in closed position. A dial 23 and an indicating finger 24 can be set so as to indicate to the operator the open and closed position of the holes 12.

In operation when a low temperature purified air is desired the tank A is filled about two fifths full of clear cold water and valves 3, 5 and 25 closed. Air is then blown or pumped through pipe 10 into the pipe 9. The holes 12 are set at the desired opening by the handle 15 and the air passes out of the same and through the water in the tank A. Pressure is maintained by the air passing into the tank until it is cooled and after it is reduced in temperature and purified by the water it can at any time be released through pipe 25 to the cream tanks or wherever it is to be used.

An important feature of my invention is in the ready adjustment of the size of the holes which would be necessary for the different atmospheric temperatures in different places and at different times of the year. Thus if the size of the openings 12 is reduced to less than the area of the pipe 10 the air will be compressed and heated in said pipe and will naturally lose some heat before it enters the water, as it is surrounded by a lower temperature. This is an advantage because the air when reduced in temperature before entering the tank will not therefore raise the temperature of the water to as high a temperature.

In accordance with the patent statutes I have described the principles of operation of my invention together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. Apparatus of the class set forth, comprising in combination, a receptacle adapted to contain a cooling liquid, means having orifices adapted to project compressed air into said cooling liquid and means for regulating the size of said orifices.

2. In apparatus of the class set forth, a receptacle adapted to contain a cooling liquid, means having orifices adjustable in size to inject compressed air into said cooling liquid, means for indicating the size of said orifices, and means for conducting the air which has been released in said cooling liquid from said receptacle.

3. In apparatus of the class set forth, a receptacle adapted to hold a cooling liquid, a pipe projecting into the bottom of said receptacle having perforations adapted to admit compressed air into the liquid in said receptacle, a sleeve longitudinally movable in said pipe and means for moving said sleeve in said pipe to regulate the size of the passages leading into said receptacle.

4. In apparatus of the class set forth, a receptacle adapted to hold a cooling liquid, a pipe having a perforated end adapted to admit compressed air into said cooling liquid, a sleeve longitudinally slidable in said pipe having perforations adapted to coincide with the perforations in said pipe, means for moving said sleeve longitudinally in said pipe to regulate the size of the passages leading into said receptacle and a dial associated with said adjusting means for indicating the amount of adjustment.

In testimony whereof, I have signed my name to this specification in the presence of two subscribing witnesses.

GEORGE SINCLAIR.

Witnesses:
STELLA L. WASCHENBERGER,
F. G. BRADBURY.